┌─────────────────────────────────────────┐
United States Patent Office              3,555,094
│                                          Patented Jan. 12, 1971
└─────────────────────────────────────────┘

3,555,094
PREPARATION OF 1,1'-(FLUOROIMINO)BIS(N,N,N', N',1-PENTAFLUOROMETHANEDIAMINE)
John J. Hoekstra, Midland, Mich., assignor to The Dow Chemical Company, Midland, Mich., a corporation of Delaware
No Drawing. Filed Aug. 31, 1962, Ser. No. 222,257
Int. Cl. C07c 87/20, 87/22
U.S. Cl. 260—583                    1 Claim

ABSTRACT OF THE DISCLOSURE

Process for preparing fluorinated biguanide which comprises passing fluorine into substantially anhydrous biguanide (or salts thereof) at a temperature below 10° C., collecting the reaction product mixture, and separating fluorinated biguanide therefrom.

---

This invention relates to a novel chemical compound and more particularly is concerned with a new organic fluorine-nitrogen compound, 1,1'-(fluoroimino)bis(N,N, N',N',1-pentafluoromethanediamine) corresponding to the formula:

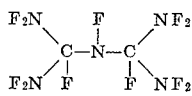

This novel chemical compound is particularly suitable for use as a high energy oxidizing agent both in liquid and solid rocket propellant systems. The specific impulse of systems containing this material are markedly increased over that obtained using presently available fluorine containing oxidizers.

To illustrate; a substantially stoichiometrically balanced fuel-oxidizer rocket propellant system based on 1,1'-(fluoroimino)bis(N,N,N',N',1 - pentafluoromethanediamine), hereinafter designated as $F_{11}BG$, hydrazine and nitrogen tetraoxide exhibits a specific impulse of about 314.

The compound is prepared by the direct low temperature fluorination of biguanide, biguanide sulfate or biguanide fluoride.

Conveniently $F_{11}BG$ is produced by introducing gaseous fluorine diluted with an inert gas e.g. nitrogen, with vigorous agitation and under substantially anhydrous conditions into an appropriate biguanide based material in a reactor maintained at a temperature of from about minus 25° C. to about 10° C. above zero centigrade. Ordinarily, the reactor temperature is maintained at from about 0° C. to about +5° C.

The product mixture is collected in a cold receiver, e.g. a cold trap cooled by Dry Ice-acetone or a Freon fluorocarbon slush bath, i.e. a slurry of a solid Freon fluorocarbon in a liquid Freon fluorocarbon maintained at a temperature of about minus 80° C. or lower. The $F_{11}BG$ product readily is separated from the product mixture by distillation, codistillation, chromatography or other separation procedures. Both fractional codistillation and chromatographic techniques provide excellent means for recovering the compound.

Ordinarily, to aid in controlling the reaction rate, the biguanide based reactant is diluted with an inert, solid inorganic fluoride, such as the alkali or alkaline earth metal fluorides. Sodium fluoride alone or a mixture of sodium fluoride and magnesium fluoride have been found to be particularly useful diluents. The amount of inorganic fluoride used conveniently ranges from about 2 to about 10 times or more the weight of the biguanide based reactant.

Although fluorine can be introduced directly into the reactor, desirably this reactant is employed in diluted form. A mixture of an inert gas, such as nitrogen, argon, etc., and fluorine wherein the amount of fluorine in the mixture ranges from about 20 to about 40 percent on a volume basis is very satisfactory. This dilution range is not critical, however.

The ratio of fluorine and biguanide based material is not critical except that for optimum product yield, fluorine in excess of that stoichiometrically for the compound production is used. Any excess fluorine that is not reacted can be recovered from the effluent product mixture exiting from the reactor and can be recycled for subsequent reaction.

The novel compound can be prepared in a batch type or continuous operation. Reactors and processing equipment to be employed are fabricated from those materials which are not detrimentally affected by the reactants or product materials and which have the requisite physical strength and desired structural characteristics as is understood by one skilled in the art. Stainless steel, nickel, nickel alloys and the like all are suitable materials of construction.

The following example describes a method for preparing this compound but is not meant to be limiting.

EXAMPLE

Preparation of 1,1'-(fluoroimino)bis(N,N,N',N',1-pentafluoromethanediamine)

A mixture of fluorine and nitrogen gases comprising 1 part by volume fluorine and 2 parts by volume nitrogen at a flow rate of about 300 cubic centimeters per minute was passed into a stirred, substantially anhydrous mixture of about 5 grams biguanide sulfate, about 25 grams sodium fluoride and about 25 grams magnesium fluoride contained in a Monel alloy reactor immersed in a cooling bath maintained at about 0° C. The reaction product mixture was collected in traps immersed in a Freon fluorocarbon slush bath at a temperature of from about minus 120 to minus 140° C. The collected product mixture separated into its components by chromatographic techniques and the novel compound 1,1'-(fluoroimino)bis(N,N,N', N',1 - pentafluoromethanediamine) recovered therefrom. This compound was characterized as follows:

(1) Normal boiling point: 87.9° C.
(2) Vapor pressure: 63 mm. Hg absolute at 20° C.
(3) Density:
    1.79±0.3 at 0° C.
    1.70±0.3 at 25° C.
(4) Molecular weight: 303.
(5) Infrared spectra show C-F and N-F bands and is consistent with the structure given.
(6) Mass spectrometry results are consistent with the molecular weight of 303 and the given structure of this compound.
(7) $\Delta H_v$: 7.7 kcal./mole.
(8) Nuclear Magnetic Resource Data

| Peak φ      | Assignment | Area ratio |
|-------------|-----------|------------|
| −24.0       | NF₂       | 8.2        |
| +127.5 [1]  | CF        | 2.1        |
| +95.3 [1]   | NF        | 0.9        |

[1] Doublet by NF 24 cps.

These data confirm the structure of the compound.

I claim:
1. A process for preparing 1,1' - (fluoroimino)bis (N,N,N',N',1 - pentafluoromethanediamine) which comprises:
   (a) passing a mixture of gaseous fluorine and nitrogen into a mixture of biguanide sulfate, sodium fluoride and magnesium fluoride maintained at about 0° C. said gaseous fluorine-nitrogen mixture containing about 1 part by volume fluorine and about 2 parts by volume nitrogen and the combined weights of said sodium fluoride and magnesium fluoride being about 10 times the weight of said biguanide sulfate, (b) collecting the effluent reaction product mixture in a receiver maintained at least at about minus 80° C., and (c) separating said reaction product mixture into its component parts to recover said 1,1'-(fluoroimino)bis(N,N,N',N',1-pentafluoromethanediamine) therefrom.

References Cited

UNITED STATES PATENTS 3,354,216  11/1967  Husted et al. __ 260—583(DD)
3,461,162  8/1969  Koshar et al. __ 260—583(DD)X CHARLES B. PARKER, Primary Examiner
R. L. RAYMOND, Assistant Examiner U.S. Cl. X.R.
149—36, 74, 109